(12) United States Patent
Zhang et al.

(10) Patent No.: US 10,230,244 B2
(45) Date of Patent: Mar. 12, 2019

(54) MULTI-BAY MODULAR BATTERY CHARGING SYSTEM

(71) Applicants: Robert Bosch Tool Corporation, Broadview, IL (US); Robert Bosch GmbH, Stuttgart (DE)

(72) Inventors: Yizhuo Zhang, Arlington Heights, IL (US); David Pozgay, Wilmette, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 166 days.

(21) Appl. No.: 15/223,009

(22) Filed: Jul. 29, 2016

(65) Prior Publication Data

US 2018/0034282 A1    Feb. 1, 2018

(51) Int. Cl.
  *H02J 7/00* (2006.01)
  *H02J 7/04* (2006.01)

(52) U.S. Cl.
  CPC .......... *H02J 7/0004* (2013.01); *H02J 7/0013* (2013.01); *H02J 7/0024* (2013.01); *H02J 7/0042* (2013.01); *H02J 7/045* (2013.01)

(58) Field of Classification Search
  CPC ....... H02J 7/0004; H02J 7/0013; H02J 7/0024
  USPC .......................... 320/106, 124, 134, 136–137
  See application file for complete search history.

(56) References Cited

U.S. PATENT DOCUMENTS

| | | | |
|---|---|---|---|
| 2003/0006734 A1 | 1/2003 | You | |
| 2003/0184263 A1 | 10/2003 | Nishida et al. | |
| 2004/0164711 A1* | 8/2004 | Hayashi | H02J 7/0055 320/134 |
| 2012/0249071 A1* | 10/2012 | Yang | H02J 7/0024 320/110 |
| 2013/0271080 A1* | 10/2013 | Yoshida | H02J 1/10 320/109 |

* cited by examiner

*Primary Examiner* — Zixuan Zhou
(74) *Attorney, Agent, or Firm* — Maginot, Moore & Beck LLP

(57) ABSTRACT

A battery charging system comprises a voltage bus; at least one charging circuit comprising: an input connected to the voltage bus; an output; and a converter connected between the input and the output and configured to provide DC power to the output; a plurality of charging ports, each charging port comprising: an input; and a pair of contacts configured to connect to battery terminals, the pair of contacts being connected to the input to enable a voltage received at the input to be applied across the pair of contacts; and a plurality of switches configured to connect and disconnect the output of the at least one charging circuit to the input of any one of the charging ports in the plurality of charging ports; and a control unit operably connected to the plurality of switches and configured to operate the plurality of switches.

20 Claims, 9 Drawing Sheets

US 10,230,244 B2

MULTI-BAY MODULAR BATTERY CHARGING SYSTEM

BACKGROUND

The system and method disclosed in this document relates to battery charging systems and, more particularly, to modular battery charging systems having multiple charging cores and charging ports.

A typical battery charging system 100 is shown in FIG. 1. The system 100 includes a battery charger 104 connected to a voltage bus 108. A high-voltage power source 112 provides power to the voltage bus 108. The battery charger 104 includes integrated power electronics 116 and a port 120. The port 120 is configured to connect to a battery 124 so that the battery 124 can be charged. The power electronics 116 include circuits for converting power from the voltage bus 108 into power for charging a battery 124. One disadvantage to this type of battery charging system is that, in order to charge multiple batteries to be charged sequentially, the batteries must be manually swapped in the charger port 120 after each battery is finished charging. Similarly, in order to charge multiple batteries simultaneously, additional battery chargers must be connected to the voltage bus 108.

What is needed is a battery charging system that enables simultaneous and sequential charging of several batteries, with minimal need for manual connection and disconnection of the batteries. It would also be advantageous if the battery charging system enable control of the charging processes for maximizing charging efficiency.

SUMMARY

A battery charging system is disclosed. The battery charging system comprises: a voltage bus; at least one charging circuit comprising: an input connected to the voltage bus; an output; and a converter connected between the input and the output and configured to provide DC power to the output; a plurality of charging ports, each charging port comprising: an input; and a pair of contacts configured to connect to battery terminals, the pair of contacts being connected to the input to enable a voltage received at the input to be applied across the pair of contacts; and a plurality of switches configured to connect and disconnect the output of the at least one charging circuit to the input of any one of the charging ports in the plurality of charging ports; and a control unit operably connected to the plurality of switches and configured to operate the plurality of switches.

A method of operating a battery charging system that includes at least one charging circuit, a plurality of switches, and a plurality of charging ports is disclosed. The method comprises: operating the plurality of switches to connect the at least one charging circuit to a first charging port in the plurality of charging ports in response to a first battery being been connected to the first charging port, the at least one charging circuit including an input connected to a voltage bus, an output, and a converter connected between the input and the output and configured to provide DC power to the output, each charging port in the plurality of charging ports including an input and a pair of contacts configured to connect to battery terminals, the pair of contacts being connected to the input to enable a voltage received at the input to be applied across the pair of contacts, the plurality of switches being configured to connect and disconnect the output of the at least one charging circuit to the input of any one of the charging ports in the plurality of charging ports; and operating the at least one charging circuit to charge the first battery after connecting the at least one charging circuit to the first charging port.

BRIEF DESCRIPTION OF THE DRAWINGS

The foregoing aspects and other features of the battery charging system and method for operating a battery charging system are explained in the following description, taken in connection with the accompanying drawings.

DETAILED DESCRIPTION

Figure 1:
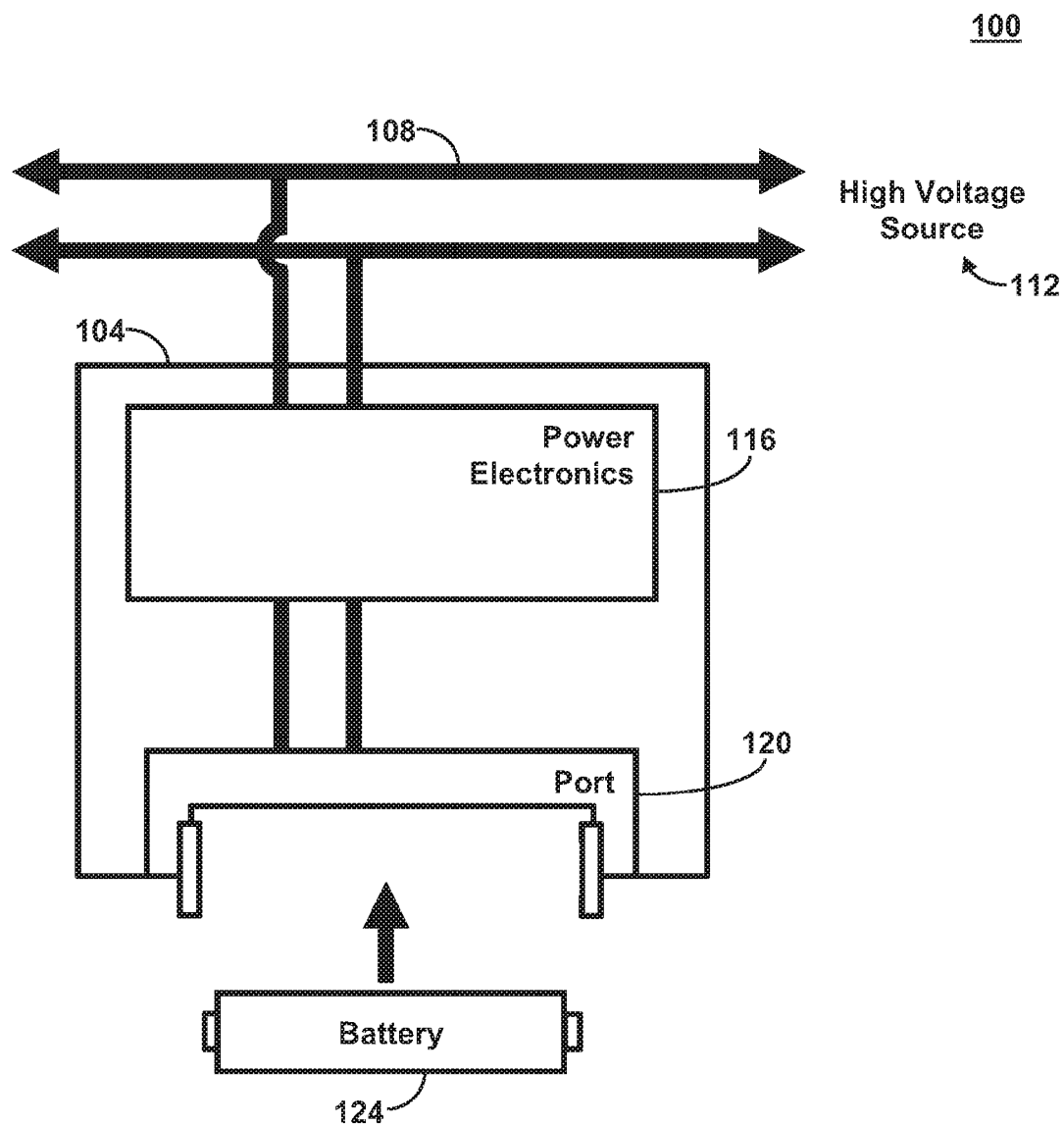
FIG. 1 shows a battery charging system according to the prior art.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Figure 2:
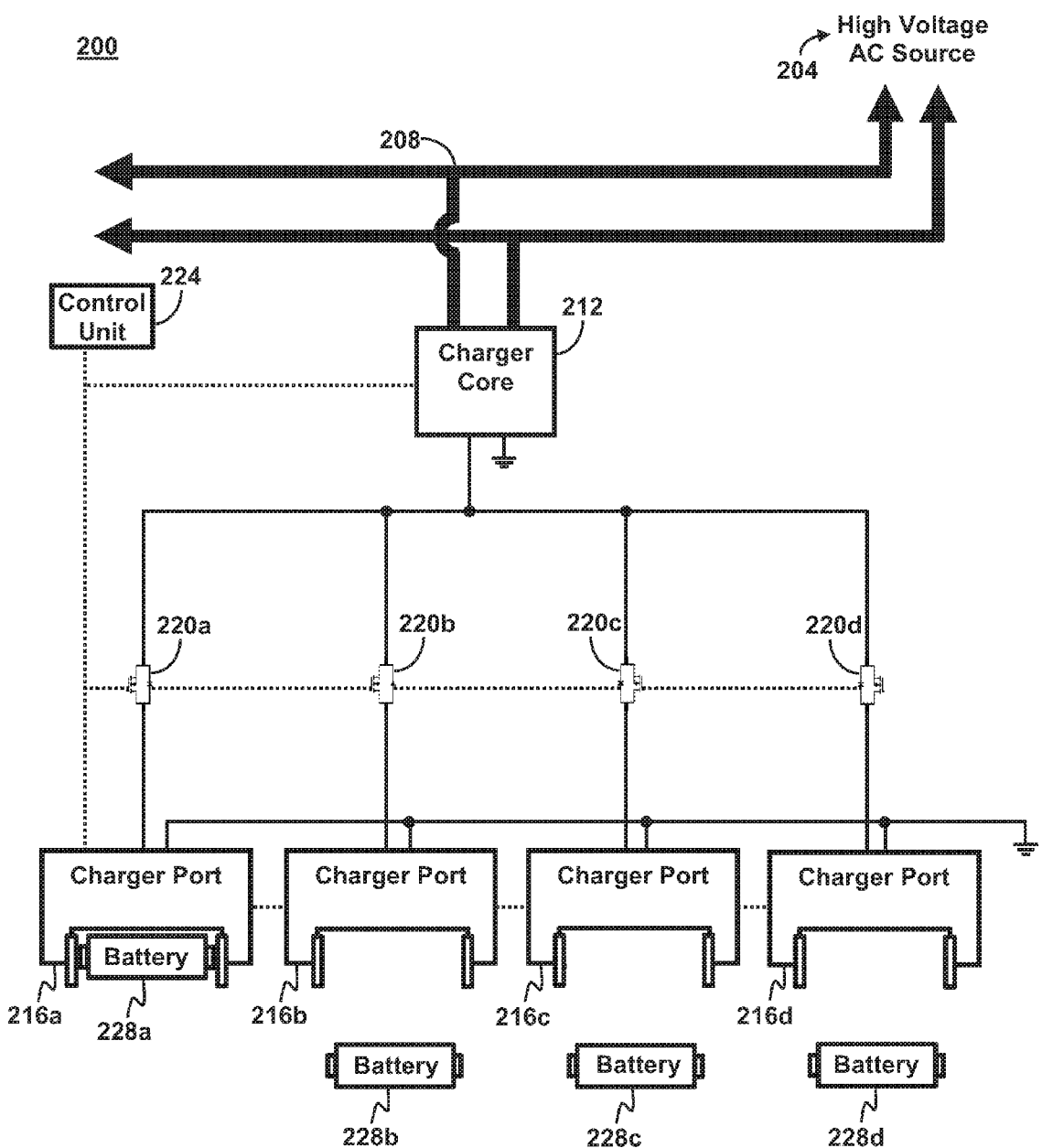
FIG. 2 shows a battery charging system configured to enable sequential charging of up to four batteries.

FIG. 2 shows a battery charging system 200 configured to enable sequential charging of up to four batteries. The battery charging system 200 includes a high-voltage alternating-current (AC) source 204 connected to an AC voltage bus 208 and configured to provide an AC voltage to the AC voltage bus 208. In other embodiments, the battery charging system 200 may instead include a high-voltage direct-current (DC) source connected to a DC voltage bus and configured to provide a DC voltage to the DC voltage bus. The battery charging system 200 includes a charger core 212 and a plurality of charger ports 216a-d. The battery charging system 200 includes a plurality of switches 220 configured to connect and disconnect the charger core 212 to any one of the charger ports 216. The battery charging system 200 includes a control unit 224 operably connected to the plurality of switches 220 and configured to operate the switches 220 to selectively control which of the charger ports 216 is connected to the charger core 212 at a given time.

Figure 3:
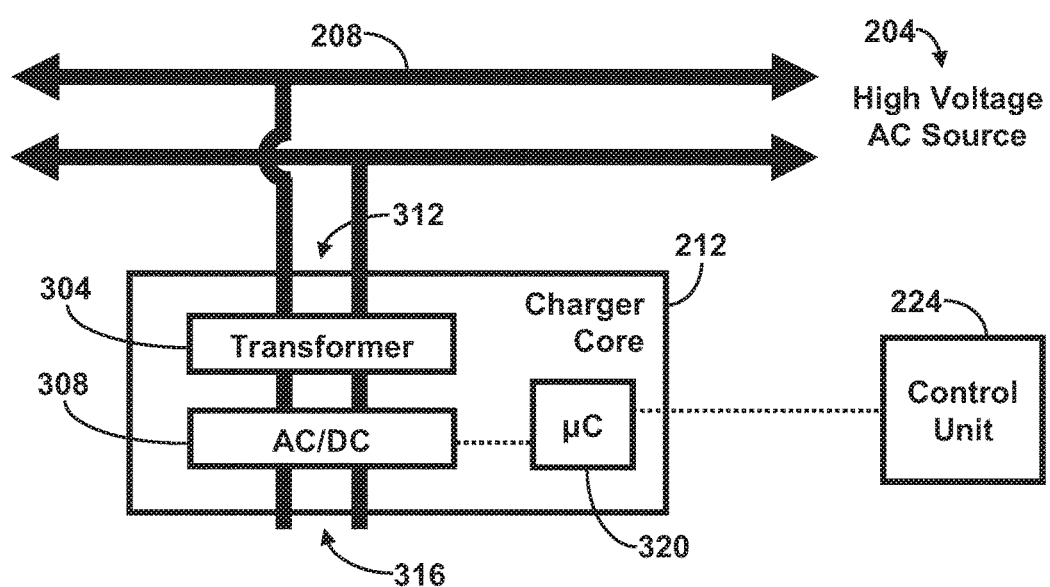
FIG. 3 shows one embodiment of a charger core of FIG. 2.

The charger core 212 is configured to convert AC power from the AC voltage bus 208 into DC power for charging batteries 228a-d connected to the charger ports 216. FIG. 3 shows one particular embodiment of the charger core 212. In the embodiment shown, the charger core 212 includes a transformer 304 and an AC/DC converter 308. The charger core 212 includes an input 312 having a positive line and a negative line. The transformer 304 is connected between the input 312 and the AC/DC converter 308. In one embodiment, the transformer 304 is configured to convert or step-down the AC voltage of the AC voltage bus 208 into an AC voltage having a lesser magnitude. The charger core 212 includes an output 316 having a positive line and a negative line. The AC/DC converter 308 is connected between the transformer 304 and the output 316. In one embodiment, the AC/DC converter 308 is configured to convert the AC voltage provided by the transformer 304 into a DC voltage and provide the DC voltage to the output 316. In other embodiments in which the charger core 212 does not include the transformer 304, the AC/DC converter 308 connected directly to the input 312 and is configured to convert the AC voltage of the AC voltage bus 208 into the DC voltage.

In one embodiment, the charger core 212 further includes a charge controller 320, which is embodied as a microcontroller or the like. The charge controller 320 is configured to operate the AC/DC converter 308 to control a charging process a battery connected to the charger core 212 via one of the charger ports 216, such as one of the of the batteries 228. In one embodiment, the charge controller 320 is connected to the control unit 224 and is configured operate the AC/DC converter 308 to perform a charging process in response to a command from the control unit 224. In one embodiment, the charge controller 320 is configured to transmit information to the control unit 224, such as a state of charge, charging current, charging voltage, etc. In one embodiment, the charge controller 320 is further configured to estimate a state of charge of the respective battery 228. In one embodiment, the charger core 212 includes sensors (not shown) for measuring the aforementioned information. When the charger core 212 is to charge one of the batteries 228, the charge controller 320 is configured to control the charging process so as to charge the battery 228 as quickly as possible without damaging the battery 228. Depending on the type of battery, the particular charging process may vary.

In one embodiment, the batteries 228 are lithium-ion batteries. In this case, the charge controller 320 may be configured to charge a respective battery 228 with a constant-current phase followed by a constant-voltage phase. Particularly, while a battery voltage of the respective battery 228 is less than a predetermined voltage, the charge controller 320 is configured to operate the AC/DC converter 308 to provide a constant DC current to the output 316. Once the battery voltage of the respective battery 228 exceeds the predetermined voltage, the charge controller 320 is configured to operate the AC/DC converter 308 to provide a constant DC voltage to the output 316. In one embodiment, the constant DC current is equal to or a function of a maximum safe current for charging the respective battery 228. In one embodiment, one or both of the constant DC voltage and the predetermined voltage are equal to or a function of a maximum safe voltage for the respective battery 228. In some embodiments, the charge controller 320 is configured to implement advantageous charging processes such as trickle charge cycles, battery maintenance, charging in preparation for storage, and charging in preparation for shipping. In one embodiment, the charge controller 320 enables to charger core 212 to discharge a battery. In embodiments which lack the charge controller 320, the control unit 224 is configured to perform the aforementioned charging functions and processes.

Figure 4:
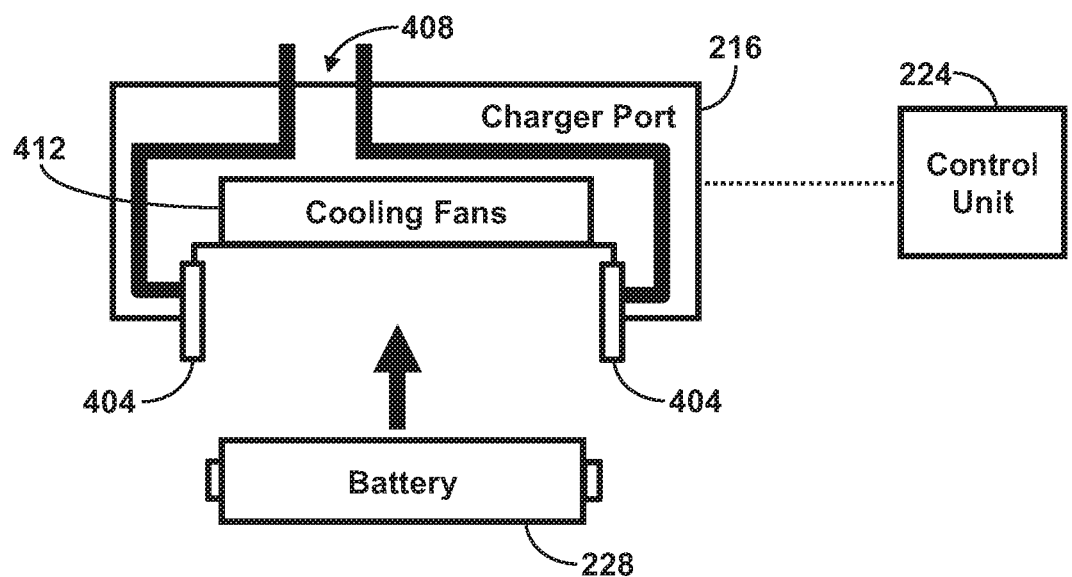
FIG. 4 shows one embodiment of a charger port of FIG. 2.

Returning to FIG. 2, the charger ports 216 are configured to connect to one of the batteries 228 to enable the respective battery 228 to be charged by the charger core 212. In one embodiment, the charger ports 216*a-d* are configured to connect batteries having different voltages, such 36V, 18V, 14.4V, and 12V. FIG. 4 shows one possible embodiment of the charger ports 216. In the embodiment shown, the charger port 216 includes a pair of contacts 404 configured to engage with terminals of the battery 228 so that the battery 228 can be charged with a voltage applied across the contacts 404. The contacts 404 are connected to a positive and negative line of an input 408 of the charger port 216 to enable a voltage received at the input 408 to be applied across the contacts 404. In one embodiment, the charger port 216 includes cooling elements, such as cooling fans 412, configured to cool the battery 228 as it charges. In one embodiment, the charger port includes sensors (not shown) for measuring battery temperature, battery voltage, battery current, individual cell voltages, state of charge, etc. In one embodiment, the charger port 216 is connected to the control unit and configured to transmit the data from the aforementioned sensors to the control unit 224. In one embodiment, the charger ports 216 are configured to identify a maximum charging current of a battery 228 that has been connected thereto and transmit the maximum charging current to the control unit 224 or the charger ports 212.

Returning to FIG. 2, the plurality of switches 220 are connected between the charger core 212 and the charger ports 216 to enable the charger core 212 to be connected and disconnect from any one of the charger ports 216 to charge batteries 228 connected to the respective charge ports 216. Particularly, in the embodiment shown, a switch 220*a* is connected between the output of the charger core 212 and the input of the charger port 216*a*. Similarly, switches 220*b*, 220*c*, and 220*d* are connected between the output of the charger core 212 and the inputs of the charger port 216*b*, 216*c*, and 216*d*, respectively. As shown, the switches 220 connect a positive line of the output of the charge core 212 to positive lines of the inputs of the charger ports 216. The negative line of the output of the charger core 212 and the negative lines of the inputs of the charger ports are connected to a common ground. However, in other embodiments, the additional switches are included to connect the negative line of the output of the charger core 212 to the negative lines of the inputs of the charger ports 216.

The control unit 224 is operably connected to the switches 220 and configured to operate each of the switches 220*a-d* to selectively connect the charger core 212 to any one of the charger ports 216*a-d*. The control unit 224 is also connected to the charger core 212 and to each of the charger ports 216*a-d*. In one embodiment, the control unit 224 is configured to receive information from the charger core 212 and the charger ports 216, including battery temperature, battery voltage, battery current, individual cell voltages, state of charge, charging time, and other status information. In one embodiment, the control unit 224 is configured to share the received information to a portable device via Bluetooth® or Wi-Fi, or with a physically connected computer. In one embodiment, the control unit 224 is configured to display the received information on an integrated or attached display device, such as a small LCD screen. In one embodiment, the control unit 224 is configured to automatically operate the switches 220 and the charger core 212 to manage charging processes for a multiple batteries 228 connected the charger ports 216.

Figure 5:
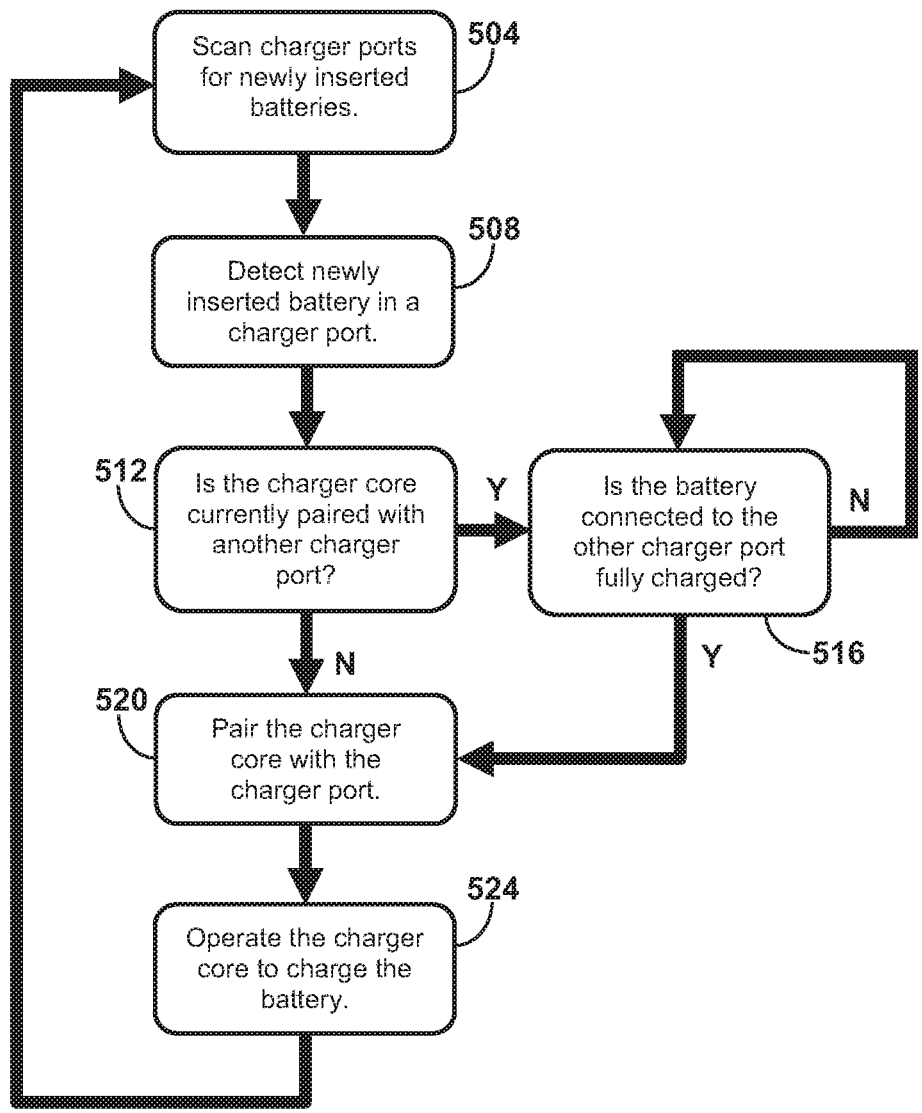
FIG. 5 shows a method of operating the battery charging system of FIG. 2 to automatically manage sequential charging for multiple batteries.

FIG. 5 shows an exemplary method 500 for operating the battery charging system 200 to automatically manage sequential charging for multiple batteries 228. When the battery charging system 200 is operated with the method 500, it provides for automatic sequential charging of multiple batteries 228 without the need for manually swapping the batteries 228 after each is finished charging. The method 500 begins with scanning of the charger ports for newly inserted batteries (block 504). Particularly, in one embodiment, the control unit 224 is configured to communicate with the charger ports 216 to determine if any new batteries 228 are connected to the charger ports 216. Next, the method 500 includes detection of a newly inserted battery in a charger port (block 508). Particularly, the control unit 224 is configured to receive a signal from one of the charger ports 216 indicating that, for example, the battery 228a has been connected to the respective charger port 216a.

Once a newly inserted battery has been detected, the method 500 continues a determination of whether the charger core is currently paired with another charger port (block 512). Particularly, the control unit 224 is configured to determine, for example, whether the charger core 212 is connected to one of the charger ports 216b-d. If the charger core is not currently paired with another charger port, then the method 500 continues pairing the charger core with the charger port in which the battery was connected (block 516). Particularly, the control unit 224 is configured to, for example, in response to the charge core 212 not being connected to another charger port 216b-d, operate the switch 220a to close, thereby establishing a connection between the charger core 212 and the respective charger port 216a in which a battery 228a was connected.

However, if the charger core is currently paired with another charger port, the method 500 continues with a determination of whether the battery connected to the other charger port is fully charged (block 520). Particularly, if the control unit 224 determines that the charger core 212 is currently connected to, for example, the charger port 216b, then the control unit 224 is configured to determine whether the battery 228b is fully charged. If the battery connected to the other charger port is not fully charged, the method 500 idles until the battery connected to the other charger port is becomes fully charged. Once the battery connected to the other charger port becomes fully charged, the method 500 continues with the pairing of the charger core with the charger port in which the battery was connected (block 516). Particularly, the control unit 224 is configured to, for example, in response to the battery 228b becoming fully charged, operate the switch 220b to open and the switch 220a to close, thereby disconnecting the charger port 216b from the charger core 212 and establishing a new connection between the charger core 212 and the charger port 216a in which a battery 228a is connected.

After the charger core is paired with the charger port, the method 500 continues with operation of the charger core to charge the battery (block 524). Particularly, after a connection is established between the charger core 212 and, for example, the charger port 216a, the control unit 224 is configured to command the charge controller 320 of the charger core 212 to begin a charging process for the battery 228a.

Figure 6:
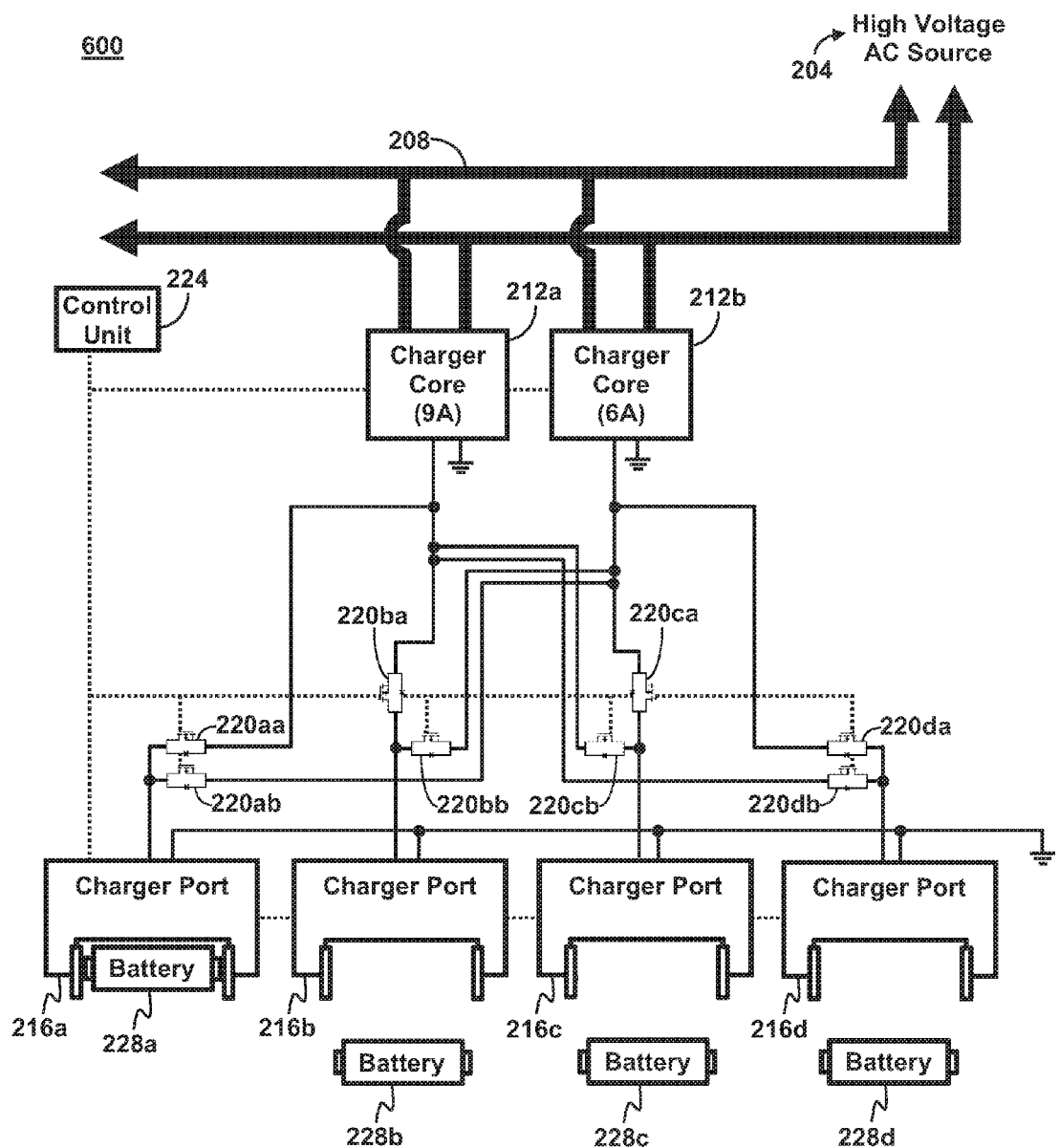
FIG. 6 shows a battery charging system configured to enable simultaneous charging of up to two batteries and sequential charging of up to four batteries.

FIG. 6 shows a battery charging system 600 configured to enable simultaneous charging of up to two batteries and sequential charging of up to four batteries. The battery charging system 600 is similar to the battery charging system 200 except that it has an additional charger core 212b. Common elements to the battery charging system 600 and the battery charging system 200 are not described and only the differences are discussed below. Unlike the battery charging system 200, which comprises a single charger core 212, the battery charging system 600 includes two charger cores 212a and 212b. The additional charger core 212b enables the battery charging system 600 to perform simultaneous charging of two batteries 228 and sequential charging of two further batteries 228.

Similar to the battery charging system 200, the battery charging system 600 includes a plurality of switches 220 configured to connect each charging core 212 to any one of the charger ports 216. Particularly, a switch 220aa is configured to selectively connect the charger port 216a to the charger core 212a. Additionally, a switch 220ab is configured to selectively connect the charger port 216a to the charger core 212b. Similarly, switches 220ba and 220bb are configured to selectively connect the charger port 216b to the charger cores 212a and 212b, respectively. Switches 220ca and 220cb are configured to selectively connect the charger port 216c to the charger cores 212a and 212b, respectively. Finally, switches 220da and 220db are configured to selectively connect the charger port 216d to the charger cores 212a and 212b, respectively. The control unit 224 is configured to operate the switches 220 to connect each charger core 212 to any one of the charger ports 216.

Figure 7:
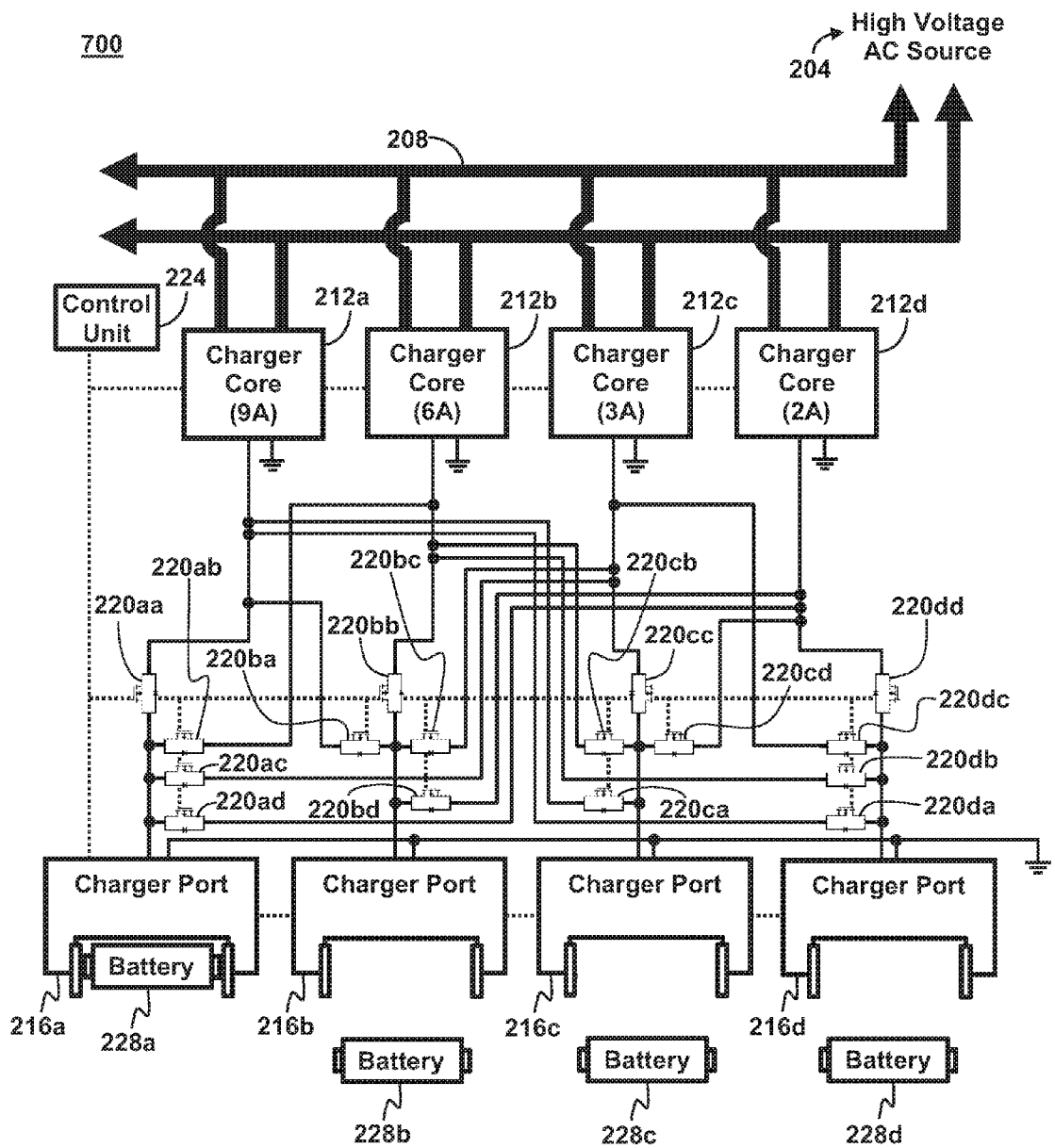
FIG. 7 shows a battery charging system configured to enable simultaneous charging of up to four batteries.

FIG. 7 shows a battery charging system 700 configured to enable simultaneous charging of up to four batteries. The battery charging system 700 is similar to the battery charging system 200 except that it has three additional charger cores 212b, 212c, and 212d. Common elements to the battery charging system 700 and the battery charging system 200 are not described and only the differences are discussed below. Unlike the battery charging system 200, which comprises a single charger core 212, the battery charging system 700 includes four charger cores 212a-d. The additional charger cores 212b-d enable the battery charging system 700 to perform simultaneous charging of up to four batteries 228.

Similar to the battery charging system 200, the battery charging system 700 includes a plurality of switches 220 configured to connect each charging core 212 to any one of the charger ports 216. Particularly, a switch 220aa is configured to selectively connect the charger port 216a to the charger core 212a. A switch 220ab is configured to selectively connect the charger port 216a to the charger core 212b. A switch 220ac is configured to selectively connect the charger port 216a to the charger core 212c. A switch 220ad is configured to selectively connect the charger port 216a to the charger core 212d. Similarly, the switches 220ba, 220bb, 220bc, and 220bd are configured to selectively connect the charger port 216b to the charger cores 212a, 212b, 212c, and 212d, respectively. The switches 220ca, 220cb, 220cc, and 220cd are configured to selectively connect the charger port 216c to the charger cores 212a, 212b, 212c, and 212d, respectively. Finally, the switches 220da, 220db, 220dc, and 220dd are configured to selectively connect the charger port 216d to the charger cores 212a, 212b, 212c, and 212d, respectively. The control unit 224 is configured to operate the switches 220 to connect each charger core 212 to any one of the charger ports 216.

As will be understood by a person having ordinary skill in the art, the battery charging systems described herein can be expanded to include any number of charger cores and charger ports, the number of charger ports generally being greater than or equal to the number of charger cores. In some embodiments having multiple charging cores 212, such as the battery charging systems 600 and 700, the charger cores 212 may have different current output capabilities. For example, in the battery charging system 600, the charger core 212a may have a 9 A output capability and the charger core 212b may have only a 6 A output capability. As a further example, in the battery charging system 700, the charger cores 212a-d may have current output capabilities of 9 A, 6 A, 3 A, and 2 A, respectively. The modular nature of the battery charging systems 600 and 700 enables the systems to make efficient use of the faster charger cores 212. Particularly, if possible, the faster charger cores 212 are always used for the constant-current phase of the battery charging process, thereby charging the batteries 228 as quickly and efficiently as possible.

Figure 8:
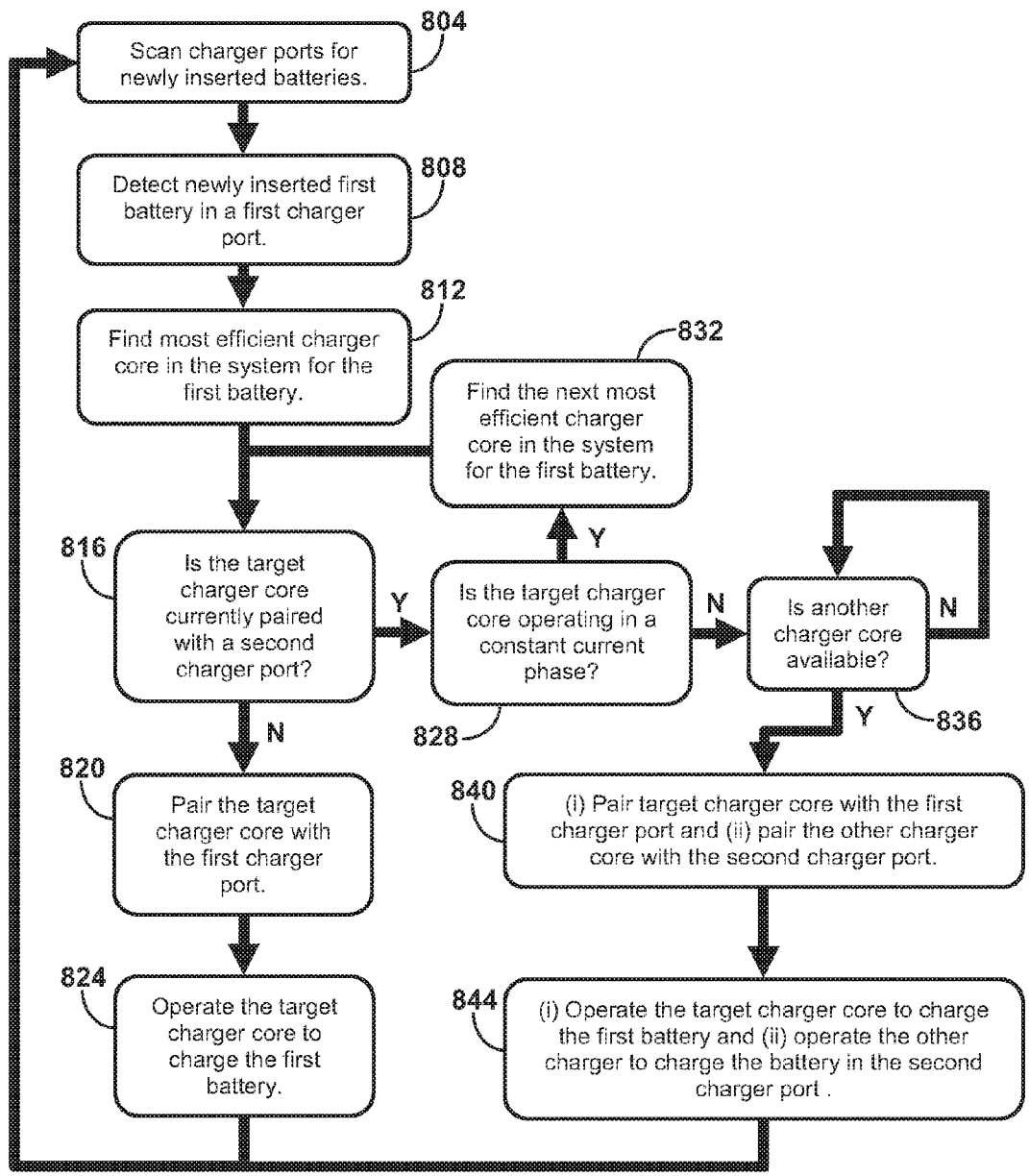
FIG. 8 shows a method of operating the battery charging system of FIG. 6 or FIG. 7 to automatically manage the efficient charging for multiple batteries.

FIG. 8 shows an exemplary method 800 for operating one of the battery charging systems 600 and 700 to automatically manage the efficient charging for multiple batteries. When the battery charging system 600 or 700 is operated with the method 800, it provides for automatic simultaneous and sequential charging of multiple batteries 228 while making efficient use of the fastest charging cores in the system. The method 800 begins with scanning the charger ports for newly inserted batteries (block 804). Particularly, in one embodiment, the control unit 224 is configured to communicate with the charger ports 216 to determine if any new batteries 228 are connected to the charger ports 216. Next, the method 800 includes detection of a newly inserted first battery in a first charger port (block 808). Particularly, the control unit 224 is configured to receive a signal from one of the charger ports 216 indicating that, for example, the battery 228a has been connected to the respective charger port 216a.

Once a newly inserted first battery has been detected, the method 800 continues with identification of the most efficient charger core in the system for the first battery (block 812). Particularly, the control unit 224 is configured to identify which of the charger cores 212 is the most efficient charger core 212 for charging the battery 228a. For example, if the battery 228a has a maximum charging current that is greater than or equal to the maximum output current of the highest output charger core 212a in the system (i.e. greater than or equal to 9 A), then the highest output charger core 212a is the most efficient charging core 212 for the battery 228a. However, if the battery 228a has a maximum charging current that is less the maximum output current of the highest output charger core 212a in the system (i.e. less than 9 A), then the most efficient charger core 212 is the lowest output charger core 212 whose output still matches or exceeds the maximum charging current of the battery 228a. For example, if the battery 228a has a maximum charging current of 5 A, the charger core 212b having an output current of 6 A is the most efficient charger core 212 for the battery 228a. Once the most efficient charger core in the system has been identified, the method 800 continues with a determination of whether the target charger core (i.e. the most efficient charger core) is currently paired with a second charger port (block 816). Particularly, the control unit 224 is configured to determine, for example, whether the charger core 212a is connected to one of the charger ports 216b, 216c, or 216d.

If the charger core is not currently paired with second charger port, then the method 800 continues with pairing of the charger core with the first charger port (block 820). Particularly, the control unit 224 is configured to, for example, in response to the charge core 212a not being connected to one of the charger ports 216b, 216c, or 216d, operate the switch 220aa to close, thereby establishing a connection between the charger core 212a and the respective charger port 216a in which a battery 228a was connected. After the target charger core is paired with the first charger port, the method 800 continues with operation of the charger core to charge the battery (block 824). Particularly, after a connection is established between the charger core 212a and the charger port 216a, the control unit 224 is configured to command the charge controller 320 of the charger core 212a to begin a charging process for the battery 228a.

However, if the target charger core is currently paired with a second charger port, the method 800 continues with a determination of whether the target charger core is operating in constant-current phase (block 828). Particularly, if the control unit 224 determines that the charger core 212a is currently connected to, for example, the charger port 216b, then the control unit 224 is configured to determine whether the charger core 212a is operating in the constant-current phase to charge the battery 228b. If the target charger core is operating in a constant-current phase, the method 800 continues with identification of the next most efficient charger core in the system (block 832). Particularly, if the control unit 224 determines that the charger core 212a is currently operating in the constant-current phase to charge the battery 228b, then the control unit 224 is configured to identify which of the charger cores 212 is the next most efficient charger core 212 for charging the battery 228a. For example, if the battery 228a has a maximum charging current greater than 9 A, the highest output charger core 212a (9 A) is the most efficient charger core 212 and the next highest output charger core 212b (6 A) is the next most efficient charging core 212 for the battery 228a. However, if the battery 228a has a maximum charging current of, for example 5 A, the charger core 212b (6 A) is the most efficient charger core 212 and the charger core 212a (9 A) is the next most efficient charger core 212 for the battery 228a. Once the next most efficient charger core has been identified, the process repeats the processing that is described above in conjunction with blocks 816, 820, and 824 or the process repeats the processing described above in conjunction with blocks 816 and 828 with respect to the next most efficient charger core 212 (i.e. the new target charger core).

If the target charger core is currently paired with a second charger port but the target charger core is not currently operating the constant-current phase, then the method 800 continues with a determination of whether another charger core is available (block 836). Particularly, if the control unit 224 determines that the charger core 212a is, for example, currently connected to the charger port 216b but is not currently operating in the constant-current phase, then the control unit 224 is configured to determine whether another of the charger cores 212 is available. If all the remaining charger cores 212 are unavailable, i.e. currently charging a battery 228, then the control unit 224 is configured to idle until a battery finishes charging, thereby making one of the charger cores 212 available.

If another charger core is available, the method 800 continues with pairing of the target charger core with the first charger port and pairing the other charger core with the second charger port (block 840). Particularly, if the control unit 224 determines that, for example the charger core 212b is available, then control unit 224 is configured operate the switch 220ba to open, the switch 220aa to close, and the switch 220bb to close, thereby disconnecting the charger core 212a from the charger port charger port 216b, connecting the charger core 212a to the charger port 216a, and connecting the charger core 212b to the charger port 216b. After the charger cores are paired with the charger ports, the method 800 continues with operation of the target charger core to charge the first battery and operating the other charger core to charge the battery in the second charger port (block 844). Particularly, after connections are established between, for example, the charger core 212a and 212b with the charger ports 216a and 216b, respectively, the control unit 224 is configured to command the charge controller 320 of the charger core 212a to begin a charging process for the battery 228a and command the charge controller 320 of the charger core 212b to begin a charging process for the battery 228b. In this way, the newly inserted battery 228a is charged with the faster charger core during the constant-current phase of charging.

Figure 9:
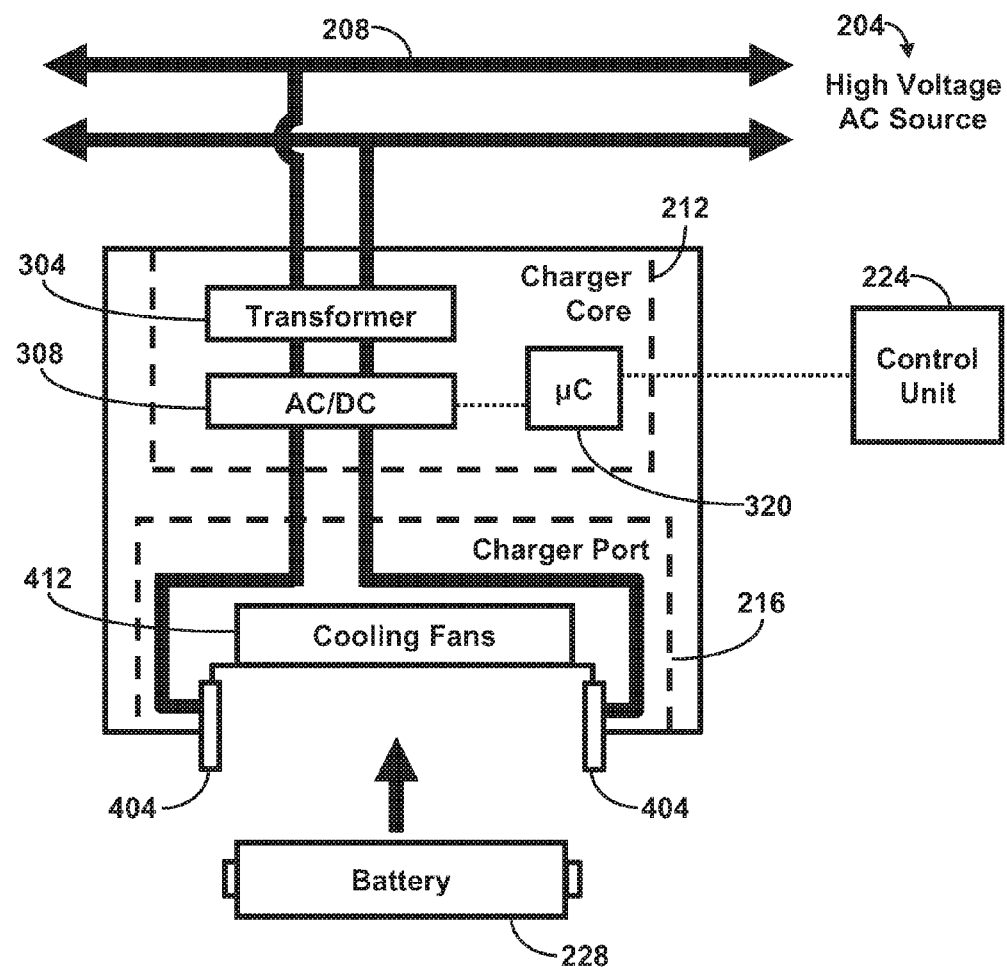
FIG. 9 shows a non-modular battery charging system that includes a charge controller.

FIG. 9 shows a battery charging system 900, which is a non-modular battery charging system that takes advantage of the charge controller 320, discussed above. The battery charging system 900 is simply an integration of the charger core 212 of FIG. 3 with the charger port 216 of FIG. 4. Although this embodiment lacks the modular functions of the battery charging systems 200, 600, and 700, it nevertheless advantageously includes the charge controller 320, with the features described above.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A battery charging system comprising:
    a voltage bus;
    a plurality of charging circuits, each charging circuit in the plurality of charging circuits having (i) an input connected to the voltage bus, (ii) an output, and (iii) a converter connected between the input and the output and configured to provide DC power to the output, each charging circuit in the plurality of charging circuits being configured to output a respective maximum charging current, at least one charging circuit in the plurality of charging circuits being configured to output a different maximum charging current than another charging circuit in the plurality of charging circuits;
    a plurality of charging ports, each charging port having (i) an input and (ii) a pair of contacts configured to connect to battery terminals, the pair of contacts being connected to the input to enable a voltage received at the input to be applied across the pair of contacts;
    a plurality of switches configured to connect and disconnect the output of each charging circuit in the plurality of charging circuits to the input of any one of the charging ports in the plurality of charging ports; and
    a control unit operably connected to the plurality of switches and configured to operate the plurality of switches, the control unit being further configured to:
        in response to a first battery being connected to a first charging port in the plurality of charging ports, selecting a first charging circuit from the plurality of charging circuits depending on the maximum charging current of the first charging circuit;
        operate the plurality of switches to connect the output of the first charging circuit to the input of the first charging port; and
        operate the first charging circuit to charge the first battery after connecting the first charging circuit to the first charging port.

2. The battery charging system of claim 1, each charging circuit in the plurality of charging circuits further comprising:
    a charge controller configured to operate the converter of the respective charging circuit to control a charging process of a respective battery that is connected to the respective charging circuit via one of the charging ports in the plurality of charging ports.

3. The battery charging system of claim 2, the charge controller being configured to:
    operate the converter of the respective charging circuit to output a constant DC current in response to a battery voltage of the respective battery being less than a predetermined threshold; and
    operate the converter of the respective charging circuit to output a constant DC voltage in response to the battery voltage of the respective battery exceeding the predetermined threshold.

4. The battery charging system of claim 1, wherein the control unit is configured to select the first charging circuit from the plurality of charging circuits further depending on a maximum charging current of the first battery.

5. The battery charging system of claim 1, the control unit being configured to:
    operate the plurality of switches to connect the first charging circuit to a second charging port in the plurality of charging ports in response to the first battery being fully charged and a second battery being connected to the second charging port; and
    operate the first charging circuit to charge the second battery after connecting first charging circuit to the second charging port.

6. The battery charging system of claim 1, the control unit being configured to select the first charging circuit from the plurality of charging circuits in response to:
    the first charging circuit being disconnected from all of the charging ports in the plurality of charging ports and the first charging circuit being configured to output a highest maximum current of the charging circuits in the plurality of charging circuits.

7. The battery charging system of claim 1, the control unit being configured to select the first charging circuit from the plurality of charging circuits in response to:
    the first charging circuit being disconnected from all of the charging ports in the plurality of charging ports and the first charging circuit being configured to output a lowest maximum current of a subset of charging circuits in the plurality of charging circuits that are configured to output a maximum current that is greater than or equal to a maximum charging current of the first battery.

8. The battery charging system of claim 1, the control unit being configured to select the first charging circuit from the plurality of charging circuits in response to:
    a second charging circuit being connected to a second charging port in the plurality of charging ports and charging a second battery with a constant current, the second charging circuit being configured to output a highest maximum current of the charging circuits in the plurality of charging circuits; and
    the first charging circuit being disconnected from all of the charging ports of the plurality of charging ports and the first charging circuit being configured to output a second highest maximum current of the charging circuits in the plurality of charging circuits.

9. The battery charging system of claim 1, the control unit being configured to select the first charging circuit from the plurality of charging circuits in response to:
    a second charging circuit being connected to a second charging port in the plurality of charging ports and charging a second battery with a constant current, the second charging circuit being configured to output a lowest maximum current of a subset of charging circuits in the plurality of charging circuits that are configured to output a maximum current that is greater than or equal to a maximum charging current of the first battery; and the first charging circuit being disconnected from all of the charging ports of the plurality of charging ports and the first charging circuit being configured to output a second lowest maximum current of the subset of charging circuits in the plurality of charging circuits.

10. The battery charging system of claim 1, the control unit being configured to:
operate the plurality of switches to disconnect the first charging circuit from the first charging port in response to:
the first charging circuit being connected to the first charging port and charging a first battery with non-constant current, the first charging circuit being configured to output a highest maximum current of the charging circuits in the plurality of charging circuits;
a second battery being connected to a second charging port; and
a second charging circuit in the plurality of charging circuits being disconnected from all of the charging ports in the plurality of charging ports;
operate the plurality of switches to connect the first charging circuit to the second charging port and connect the second charging circuit to the first charging port after disconnecting the first charging circuit from the first charging port;
operate the first charging circuit to charge the second battery after connecting the at first charging circuit to the second charging port; and
operate the second charging circuit to charge the first battery after connecting the at second charging circuit to the first charging port.

11. The battery charging system of claim 1, the control unit being configured to:
operate the plurality of switches to disconnect the first charging circuit from the first charging port in response to:
the first charging circuit being connected to the first charging port and charging a first battery with non-constant current, the first charging circuit being configured to output a lowest maximum current of a subset of charging circuits in the plurality of charging circuits that are configured to output a maximum current that is greater than or equal to a maximum charging current of the first battery;
a second battery being connected to a second charging port; and
a second charging circuit in the plurality of charging circuits being disconnected from all of the charging ports in the plurality of charging ports;
operate the plurality of switches to connect the first charging circuit to the second charging port and connect the second charging circuit to the first charging port after disconnecting the first charging circuit from the first charging port;
operate the first charging circuit to charge the second battery after connecting the at first charging circuit to the second charging port; and
operate the second charging circuit to charge the first battery after connecting the at second charging circuit to the first charging port.

12. A method of operating a battery charging system including a plurality of charging circuits, a plurality of switches, and a plurality of charging ports, the method comprising:
in response to a first battery being connected to a first charging port in the plurality of charging ports, selecting a first charging circuit from the plurality of charging circuits depending on a maximum charging current of the first charging circuit;
operating the plurality of switches to connect the first charging circuit to the first charging port in the plurality of charging ports; and
operating the first charging circuit to charge the first battery after connecting the first charging circuit to the first charging port,
wherein each charging circuit in the plurality of charging circuits has (i) an input connected to a voltage bus, (ii) an output, and (iii) a converter connected between the input and the output and configured to provide DC power to the output, each charging circuit in the plurality of charging circuits being configured to output a respective maximum charging current, at least one charging circuit in the plurality of charging circuits being configured to output a different maximum charging current than another charging circuit in the plurality of charging circuits,
wherein each charging port in the plurality of charging ports has (i) an input and (ii) a pair of contacts configured to connect to battery terminals, the pair of contacts being connected to the input to enable a voltage received at the input to be applied across the pair of contacts, and
wherein the plurality of switches are configured to connect and disconnect the output of each charging circuit in the plurality of charging circuits to the input of any one of the charging ports in the plurality of charging ports.

13. The method of claim 12 further comprising:
operating the plurality of switches to connect the first charging circuit to a second charging port in the plurality of charging ports in response to the first battery being fully charged and a second battery being connected to the second charging port; and
operating the at least one charging circuit to charge the second battery after connecting the first charging circuit to the second charging port.

14. The method of claim 12, the method further comprising:
selecting the first charging circuit from the plurality of charging circuits in response to:
the first charging circuit being disconnected from all of the charging ports in the plurality of charging ports and the first charging circuit being configured output a highest maximum current of the charging circuits in the plurality of charging circuits.

15. The method of claim 12, the method further comprising:
selecting the first charging circuit from the plurality of charging circuits in response to:
the first charging circuit being disconnected from all of the charging ports in the plurality of charging ports and the first charging circuit being configured to output a lowest maximum current of a subset of charging circuits in the plurality of charging circuits that are configured to output a maximum current that is greater than or equal to a maximum charging current of the first battery.

16. The method of claim 12, the method further comprising:
selecting the first charging circuit from the plurality of charging circuits in response to:
a second charging circuit being connected to a second charging port in the plurality of charging ports and charging a second battery with a constant current, the second charging circuit being configured output a highest maximum current of the charging circuits in the plurality of charging circuits; and
the first charging circuit being disconnected from all of the charging ports of the plurality of charging ports and the first charging circuit being configured output a second highest maximum current of the charging circuits in the plurality of charging circuits.

17. The method of claim 12, the method further comprising:
selecting the first charging circuit from the plurality of charging circuits in response to:
a second charging circuit being connected to a second charging port in the plurality of charging ports and charging a second battery with a constant current, the second charging circuit being configured to output a lowest maximum current of a subset of charging circuits in the plurality of charging circuits that are configured to output a maximum current that is greater than or equal to a maximum charging current of the first battery; and
the first charging circuit being disconnected from all of the charging ports of the plurality of charging ports and the first charging circuit being configured to output a second lowest maximum current of the subset of charging circuits in the plurality of charging circuits.

18. The method of claim 12, the method further comprising:
operating the plurality of switches to disconnect the first charging circuit from the first charging port in response to:
the first charging circuit being connected to the first charging port and charging the first battery with non-constant current, the first charging circuit being configured output a highest maximum current of the charging circuits in the plurality of charging circuits;
a second battery being connected to a second charging port; and
a second charging circuit plurality of charging circuits being disconnected from all of the charging ports in the plurality of charging ports;
operating the plurality of switches to connect the first charging circuit to the second charging port and connect the second charging circuit to the first charging port after disconnecting the first charging circuit from the first charging port;
operating the first charging circuit to charge the second battery after connecting the at first charging circuit to the second charging port; and
operating the second charging circuit to charge the first battery after connecting the at second charging circuit to the first charging port.

19. The method of claim 12, the method further comprising:
operating the plurality of switches to disconnect the first charging circuit from the first charging port in response to:
the first charging circuit being connected to the first charging port and charging the first battery with non-constant current, the first charging circuit being configured to output a lowest maximum current of a subset of charging circuits in the plurality of charging circuits that are configured to output a maximum current that is greater than or equal to a maximum charging current of the first battery;
a second battery being connected to a second charging port; and
a second charging circuit plurality of charging circuits being disconnected from all of the charging ports in the plurality of charging ports;
operating the plurality of switches to connect the first charging circuit to the second charging port and connect the second charging circuit to the first charging port after disconnecting the first charging circuit from the first charging port;
operating the first charging circuit to charge the second battery after connecting the at first charging circuit to the second charging port; and
operating the second charging circuit to charge the first battery after connecting the at second charging circuit to the first charging port.

20. The method of claim 12, the method further comprising:
selecting the first charging circuit from the plurality of charging circuits further depending on a maximum charging current of the first battery.

* * * * *